United States Patent
Mazza

(10) Patent No.: US 7,259,875 B1
(45) Date of Patent: Aug. 21, 2007

(54) CONVERSION OF UNFORMATTED DATA TO A VIEWABLE FORMAT USING A PLURALITY OF PLUG-ABLE FORMATTERS

(75) Inventor: Sam Mazza, Fort-Lee, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/521,723

(22) Filed: Mar. 9, 2000

(51) Int. Cl.
  *G06F 15/00* (2006.01)
  *G06F 9/45* (2006.01)
  *G06F 9/44* (2006.01)

(52) U.S. Cl. ............... 358/1.13; 358/1.15; 717/120; 717/139

(58) Field of Classification Search ......... 358/1.1–1.9, 358/1.11–1.18; 345/619, 672, 501, 502, 345/503–506, 522, 531, 532; 709/328, 319, 709/321, 329, 330–332; 713/2; 717/120, 717/133, 139, 134, 138, 172, 173, 175–178, 717/174; 712/233
See application file for complete search history.

(56) References Cited

U.S. PATENT DOCUMENTS

| | | | | |
|---|---|---|---|---|
| 5,287,434 A | * | 2/1994 | Bain et al. | 358/1.15 |
| 5,303,336 A | * | 4/1994 | Kageyama et al. | 358/1.15 |
| 5,511,156 A | * | 4/1996 | Nagasaka | 358/1.1 |
| 5,619,624 A | * | 4/1997 | Schoenzeit et al. | 345/418 |
| 5,805,777 A | * | 9/1998 | Kuchta | 358/1.15 |
| 6,141,681 A | * | 10/2000 | Kyle | 709/206 |

* cited by examiner

*Primary Examiner*—King Y. Poon
(74) *Attorney, Agent, or Firm*—Blakely, Sokoloff, Taylor & Zafman LLP

(57) ABSTRACT

A method of converting data to a format viewable to a viewer is disclosed. The unformatted data comprising a plurality of unformatted data trunks is outputted without formatting. The formatting of the data portions is carried out at the viewing entity side by means of a plurality of the formatters, each of which is specialized in formatting one of more of the data trunks. The formatters are located by the viewer with the help of the tags identifying each of the data portions and are plug-able in the viewer. No formatting to the data is required for outputting or storing the data.

4 Claims, 1 Drawing Sheet

CONVERSION OF UNFORMATTED DATA TO A VIEWABLE FORMAT USING A PLURALITY OF PLUG-ABLE FORMATTERS

TECHNICAL FIELD

This invention relates to data collection and interpretation, and more particularly, to a method of converting unformatted data into a format that is viewable to a viewing entity or a variety of such entities.

BACKGROUND OF THE INVENTION

In voice processing and similar systems, often system data must be formatted and viewed by operators.

When an application presents data to a viewing entity (e.g., a printer), the data typically is outputted in a format that can be understood by the viewing entity. The application may output the formatted data directly to the viewing entity, or store the formatted data in an external storage for later inspection or presentation by the viewing entity. It is expected that, with the help of a viewer (e.g., a printer software), this viewing entity is capable of deciphering the data format as outputted for processing or display. In addition, data conversion is also required for the sharing of data stored among different writing entities.

Data conversion or data formatting, which is typically carried out by the writing entity since it is in possession of the client code of the application, is an expensive operation. In addition, the formatted data also requires more storage than the unformatted data. These costs are further increased in a situation where the same data or portions thereof need to be converted into various formats required by different viewers. For example, when a running program outputs data at various terminals, the same data or some of the data portions are required to be printed or presented at different printers or screens, which may be using different viewers.

Furthermore, when a running program is outputting formatted data, the system performance may be adversely affected by the data formatting process. For example, when a program is running for debugging purpose, events are outputted at various portions of the application by printing out or presenting the formatted data portions at different printers or screens for further analysis. However, the formatting affects the "real time" operation of the system. Hence, a software bug may change behavior due to the printing of the data needed to diagnose the problem.

It has been proposed that the data be formatted by the viewer at the viewing entity, so as to overcome the discussed above problems because the data would be outputted in its unformatted state. However, the viewer cannot by itself understand the objects (data) in the log output by a typical voice processing application. It must use the help of reader servants customized for each type of objects. The disadvantages are in that the viewer would be complex.

SUMMARY OF THE INVENTION

The present invention is directed to the above problems existing in the prior art.

According to the invention, the formatting of the data is not carried out at the writing entity side, but is the responsibility of the viewing entity. The data, which includes a plurality of unformatted data portions, is provided to the viewing entity in an unformatted style. A plurality of formatters, each of which specializes in formatting one or more of the data portions into a format viewable to a viewer at the viewing entity, are located for each of the data portions at the viewing entity. The data portions are thereafter converted into the format by said formatters and presented to the viewer.

Identifying means, such as tags, is provided to identify each of the data formatted. The formatters for each data portion may be located by its identifying tag. In a preferred embodiment, the locating of the formatters is carried out by the viewer and the formatters are plug-able into the viewer.

In this way, no data conversion is required at the writing entity since data is outputted simply in its unformatted style. No client code is required to prepare the object for output and therefore any object type may be written with a simple interface. Less storage space is required for storing the data that is now stored in its unformatted style. Data portions of different formats from different writing entities may share the same storage because the conversion of these unformatted data portions is carried out by their respective formatters at the viewing entity.

BRIEF DESCRIPTION OF THE DRAWINGS

Figure one is a conceptual block diagram of the functional components of the present invention.

DETAILED DESCRIPTION OF THE INVENTION

Figure 1:
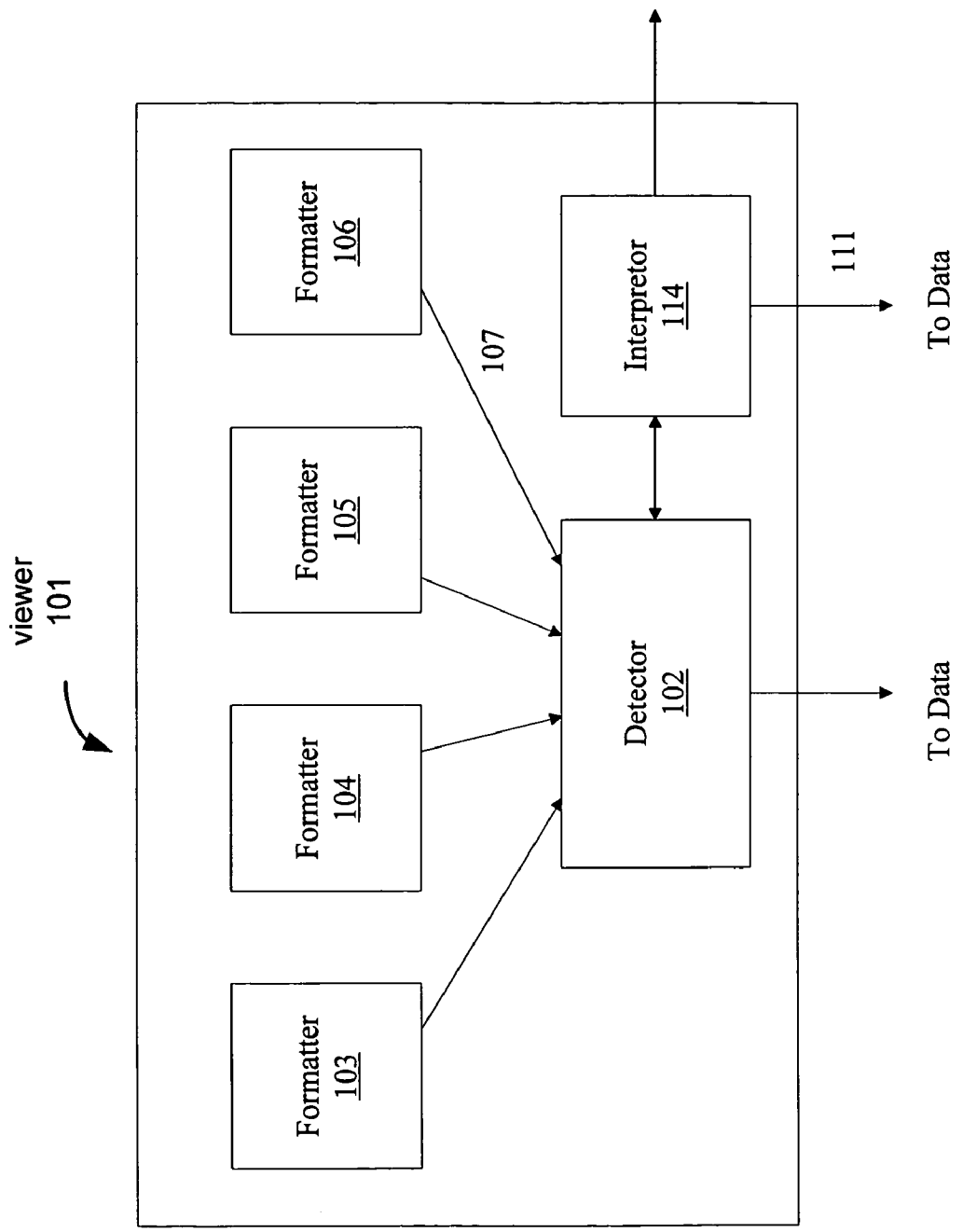

Generally, when information or data is presented to a viewing entity (printer, screen, etc), the data should be presented in a human readable form, i.e., in a format viewable to the viewing entity with the help of a viewer (viewing software). Usually the conversion of the data is carried out by the writing entity before it is outputted from a program, with the client code included in the object for output.

In the present invention, the data, which may comprise a plurality of unformatted data portions, is output in its unformatted style to the viewing entity, or may be stored in its unformatted style before being presented to the viewing entity. The unformatted data portions are eventually converted at the viewing entity into the format required by the viewer of the viewing entity.

These data portions may be in different formats as, for example, they are produced by different writing entities. A plurality of formatters, each of which is capable of formatting one or more of the data portions into the format viewable to the viewer, are also provided to the viewing entity.

Tags are included in the outputted unformatted data for the purpose of identifying each of the data portions. For each of the data portions, a specific formatter, which is specialized in reading this unformatted data portion and conversing it into a format viewable to the viewer, may be located by using the identifying tag of that data portion.

Preferably, the locating of the formatters for the data portions is carried out by the viewer. The formatters are plug-able to the viewer when they are located. These formatters are provided from the writing entity to the viewing entity together with the unformatted data, or may be provided in other way, for example, over Internet. When a formatter is located by the viewer using its identifying tag, the viewer allows the formatter plug in to convert the data portion into the format required by the viewer. If no formatter for a particular data portion can be located by the viewer, this data portion can be skipped with no adverse effect to the performance of the viewer.

With the plug-able formatters specialized in converting different data portions, the viewer does not have to be a complex one. Furthermore, different writing entities can share the data stored.

FIG. 1 depicts a conceptual diagram of a viewer 101. The viewer 101 may be implemented in software and resides on a viewing entity such as a thin client, PC computer, etc. In operation, packets or blocks of data are to be processed by entering interpreter 114. The blocks may be in machine readable format. The blocks contain a tag which indicates the type of formatter necessary to format and interpret the data coming from an arbitrary data source, such as, for example, a hard disk or other bulk storage device.

When it is desired to read in and interpret the data, a detector 102 reads the tag in the header of the first block of data or packet. The tag identifies a type of interpretation and formatting required. The tag may specify a language, whether color or black and white formatting is required, etc. Moreover, the tag may specify that the data is to be interpreted and formatted in several different ways. For example, the interpreter may specify that the incoming data stream is to be interpreted and output in two different formats, one for printing and another for viewing. Alternatively, the different formatters could relate to different languages, print type, etc.

Preferably, a standard interface 107 exists between the formatters 103-106 and the detector 102. When the detector identifies the one or more formatters requested in the incoming data stream, the appropriate formatters are loaded into interpreter 114. If plural formatters are used, then plural interpreters 114 may exist and receive duplicate copies of the incoming data stream 111 in parallel. In its simplest form, the interpreter may simply be the hardware that runs the formatting software. The formatters are then removed from the interpreter after the data is processed. It is noted that in multitasking systems, there may be times when blocks or packets of data arriving for display are unrelated to each other but instead relate to different tasks being performed. For example, the data stream may contain in sequence, two blocks of data related to a first software application, four more blocks of data related to a second application, then one block related to the first application, and then two more related to the second application. By reading the header in each block, the interpreter can seamlessly interpret and format all of the intermixed blocks of data. The intermixed blocks can be processed by having two interpreters 114. As the detector detects the tag in the header, it routes it to the proper interpreter.

Alternatively, the a single interpreter can be utilized, with the formatters 103-106 being loaded and reloaded every time the required formatter for incoming packets changes.

This latter method is less preferred because it involves the timesharing of the interpreter by two or more different formatters, and the constant replacing in the interpreter 114 of the operative software. This may slow down system performance.

By standardizing the interface 107, various formatters can be written to work with the same interpreter. This means that as new formats are desired, the remainder of the software for processing, interpreting, and displaying the unformatted data need not be rewritten.

In the present invention, the formatters and the viewer are separate from each other until the formatters plug into the viewer. Therefore, it is possible for a data portion to be converted into different formats required by different viewers. In other words, the different formatters may be located by different viewers for the same data portion so as to convert it into different formats that are viewable to respective viewers. It is not necessary for the same data portion to be converted into different formats at the writing entity level, which is an expensive operation.

Because the conversion of the data portions are implemented at the viewing entity, a running program can output unformatted data and no formatting process is necessary. Therefore, there is no adverse timing effects from the formatting process to the system performance.

From the foregoing, it will be observed that numerous variations and modifications may be effected without departing from the true spirit and scope of the novel concept of the invention. For example, the tags can be provided to the viewing entity separately from the data. The formatters may work separately to the viewer instead of a plug-in mode. The viewer may be a generic viewer available to the public or be one provided by the writing entity specifically for viewing their data. It is intended to cover by the appended claims all such modifications as fall within the scope of the claims.

What is claimed is:

1. A method of presenting data to viewers of a viewing entity, comprising:
    receiving unformatted data from a writing entity at the viewing entity, the unformatted data comprising a portion having an associated tag to identify formats for formatting the portion;
    receiving, together with the portion, a plurality of formatters at the viewing entity, wherein each formatter is capable of formatting a portion of unformatted data into a format for viewing by one of the viewers;
    selecting a first formatter from the plurality of received formatters to format the portion for a first viewer based at least in part on the associated tag;
    routing the first formatter and a first copy of the portion to one of a plurality of interpreters capable of loading each of the formatters;
    loading the selected formatter;
    formatting the first copy of the portion by the first formatter for viewing by the first viewer;
    selecting a second formatter from the plurality of received formatters to format the portion for a second viewer based at least in part on the associated tag;
    routing the second formatter and a second copy of the portion to one of the plurality of interpreters;
    loading the second formatter; and
    formatting the second copy of the portion by the second formatter for viewing by the second viewer.

2. The method of claim 1, wherein copies of the portion of unformatted data are sent in parallel to the plurality of interpreters.

3. The method of claim 1, wherein the unformatted data comprises multiple portions.

4. The method of claim 3, wherein the multiple portions are produced by different writing entities prior to being sent to the viewing entity.

* * * * *